United States Patent
Bohlender et al.

(10) Patent No.: US 10,760,822 B2
(45) Date of Patent: *Sep. 1, 2020

(54) ELECTRIC HEATING DEVICE

(71) Applicant: Eberspacher catem GmbH & Co. KG, Herxheim (DE)

(72) Inventors: Franz Bohlender, Kandel (DE); Andreas Schwarzer, Frankfurt am Main (DE); Michael Niederer, Kapellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 324 days.

This patent is subject to a terminal disclaimer.

(21) Appl. No.: 15/832,171

(22) Filed: Dec. 5, 2017

(65) Prior Publication Data

US 2018/0156493 A1 Jun. 7, 2018

(30) Foreign Application Priority Data

Dec. 6, 2016 (DE) .......... 10 2016 224 296
Feb. 9, 2017 (EP) ................. 17 155 418

(51) Int. Cl.
*F24H 9/20* (2006.01)
*F24H 1/00* (2006.01)
(Continued)

(52) U.S. Cl.
CPC ......... *F24H 9/2028* (2013.01); *B60H 1/2225* (2013.01); *F24H 1/009* (2013.01);
(Continued)

(58) Field of Classification Search
CPC .... F24H 9/2028; F24H 9/1827; F24H 9/1872; F24H 1/009; F24H 1/103; F24H 1/121;
(Continued)

(56) References Cited

U.S. PATENT DOCUMENTS 3,086,187 A 4/1963 Duggan et al.
4,086,467 A 4/1978 Grant
(Continued)

FOREIGN PATENT DOCUMENTS

EP 0 026 457 A2 4/1981
EP 2884817 6/2015

OTHER PUBLICATIONS

U.S. Appl. No. 15/832,082, filed Dec. 5, 2017, for "Electric Heating Device and PTC Heating Element for Such".
(Continued)

*Primary Examiner* — Tuan N Nguyen
(74) *Attorney, Agent, or Firm* — Boyle Fredrickson S.C.

(57) ABSTRACT

A PTC heating element includes a heating element casing that fits, as a structural unit, at least one PTC element and contact plates that energize the PTC element and that form contact strips for an electrical plug connection in order to electrically connect electrodes that are electrically connected to the PTC element. The PTC element is covered with an insulation layer at least on one of its two main side surfaces. In order to provide such a heating element casing that is inexpensive to produce and of a light-weight configuration, the PTC heating element comprises an injection-molded plastic frame which encloses the insulation layer only at the edge and which defines oppositely disposed frame openings, behind which the PTC element with its main side surfaces is located.

18 Claims, 13 Drawing Sheets

(51) Int. Cl.
*F24H 1/12* (2006.01)
*H05B 1/02* (2006.01)
*H05B 3/24* (2006.01)
*F24H 1/10* (2006.01)
*B60H 1/22* (2006.01)
*F24H 9/18* (2006.01)
*H05B 3/04* (2006.01)
*F24H 3/04* (2006.01)
*H05B 3/02* (2006.01)
*H05B 3/14* (2006.01)
*H05B 3/06* (2006.01)

(52) U.S. Cl.
CPC ............ *F24H 1/103* (2013.01); *F24H 1/121* (2013.01); *F24H 3/0429* (2013.01); *F24H 9/1827* (2013.01); *F24H 9/1872* (2013.01); *H05B 1/0236* (2013.01); *H05B 1/0244* (2013.01); *H05B 3/02* (2013.01); *H05B 3/04* (2013.01); *H05B 3/06* (2013.01); *H05B 3/14* (2013.01); *H05B 3/141* (2013.01); *H05B 3/24* (2013.01); *B60H 2001/2278* (2013.01); *H05B 2203/02* (2013.01); *H05B 2203/023* (2013.01)

(58) Field of Classification Search
CPC ... F24H 3/0429; B60H 1/2215; B60H 1/2225; H05B 1/0236; H05B 1/0244; H05B 3/02; H05B 3/06; H05B 3/14; H05B 3/141; H05B 3/24; H05B 2203/02; H05B 2203/023
USPC .......................................................... 219/520
See application file for complete search history.

(56) References Cited

U.S. PATENT DOCUMENTS

| | | | |
|---|---|---|---|
| 4,327,282 A * | 4/1982 | Nauerth | H05B 3/10 219/505 |
| 8,183,505 B2 | 5/2012 | Niederer et al. | |
| 10,098,183 B2 | 10/2018 | Bohlender et al. | |
| 2007/0068914 A1 | 3/2007 | Zeyen et al. | |
| 2008/0099464 A1* | 5/2008 | Niederer | F24H 9/1827 219/520 |
| 2013/0015176 A1 | 1/2013 | Twiney et al. | |

OTHER PUBLICATIONS

U.S. Appl. No. 15/832,262, filed Dec. 5, 2017, for "Electric Heating Device".
U.S. Appl. No. 15/832,904, filed Dec. 6, 2017, for "Electric Heating Device".
U.S. Appl. No. 15/832,956, filed Dec. 6, 2017, for "Electric Heating Device and PTC Heating Element of an Electric Heating Device".

* cited by examiner

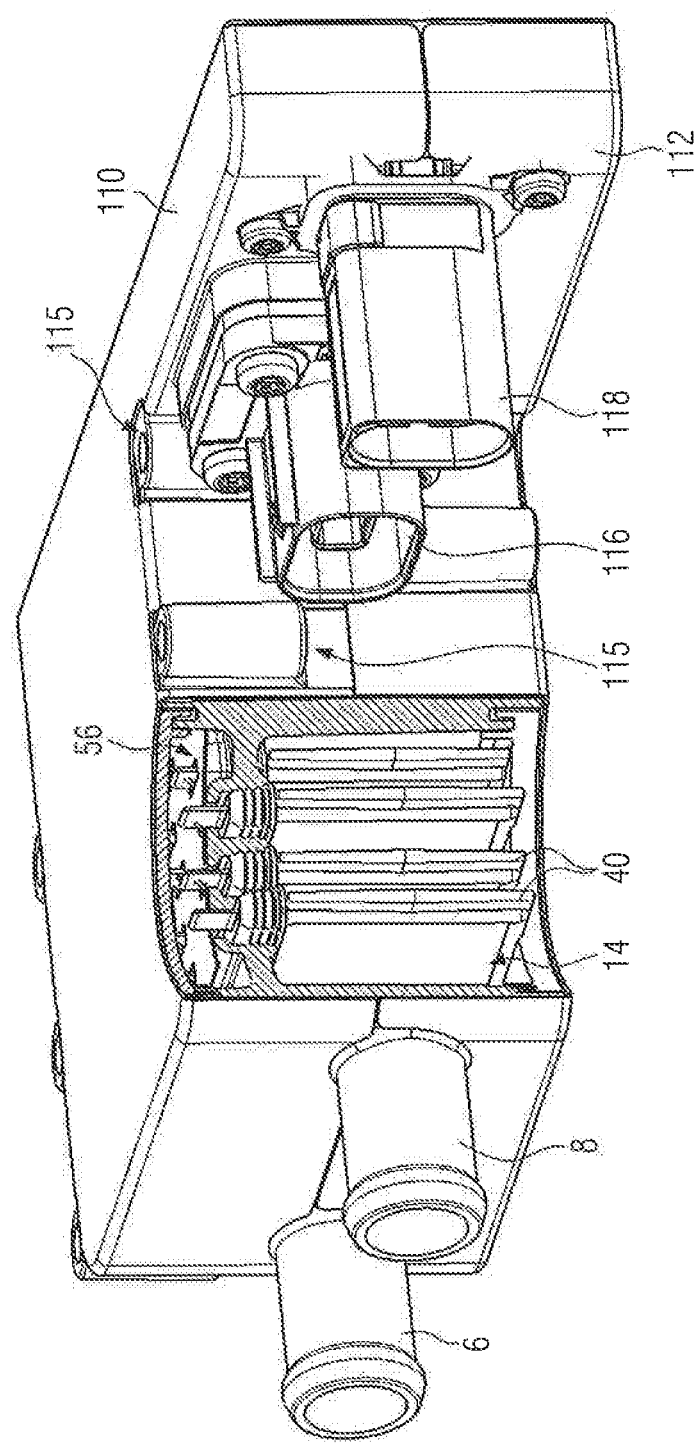

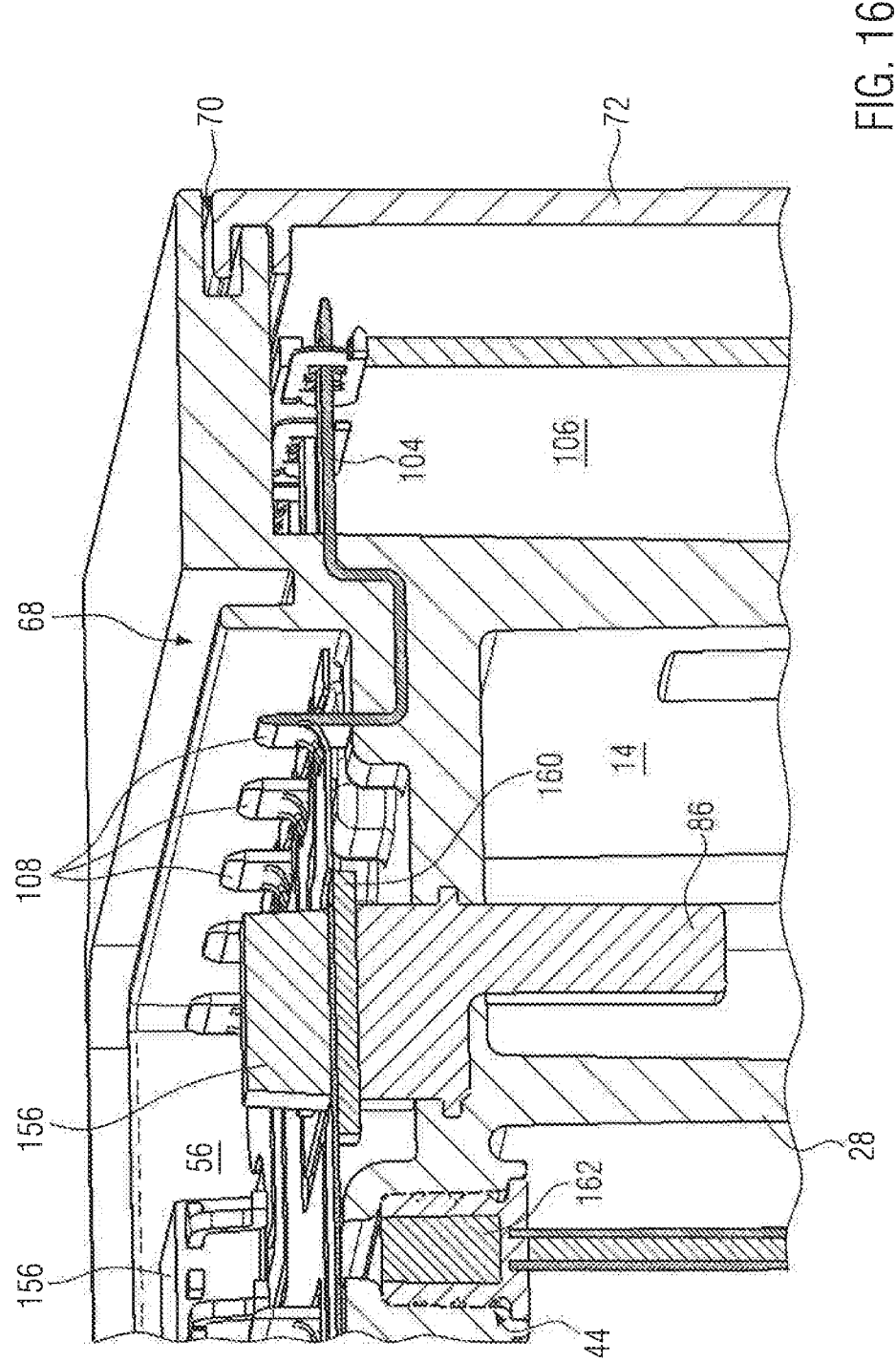

ELECTRIC HEATING DEVICE

BACKGROUND OF THE INVENTION

1. Field of the Invention

The present invention relates to a PTC heating element with a heating element casing which fits at least one PTC element and contact plates that energize the PTC element and form contact strips for an electrical plug connection in order to electrically connect electrodes that are electrically connected to the PTC element as a structural unit.

2. Description of the Related Art

Such a PTC heating element is known, for example, from EP 2 607 121 A1. This prior art PTC element is the PTC heating element of an air heater. Accommodated in a positioning frame forming the heating element casing are several PTC elements which are contacted on oppositely disposed main side surfaces by a contact plate, which are locked to the positioning frame. At one face side, connection ports project beyond the heating element casing and are integrally formed on the heating element casing and sealing sleeves made of Teflon with a labyrinth seal provided on the outer peripheral surface are drawn the connection ports. Insulation layers formed from plastic film are respectively applied to the outer side of the contact plates facing away from the PTC elements.

Similar PTC heating elements are known from EP 1 253 808 A1 and EP 1 395 098 A1, respectively. In this prior art, the contact plate is overmolded at least on one side together with the insulation layer during the production of the heating element casing so that only the PTC elements are inserted into the opening of the frame-shaped heating element casing and are to be covered on the opposite side by the contact plate and the insulation.

Although such an embodiment represents a simplification in terms of production technology as compared to the previously described prior art, the design is still relatively bulky and complex. The present invention seeks to provide a PTC element, in particular, for the automotive industry. PTC heating elements are increasingly used in motor vehicles, in particular in the field of electric mobility. They must be inexpensive to manufacture and as light as possible. Furthermore, good heat decoupling of the heat generated by the PTC element is desired, since the PTC elements have self-regulating properties and can only be operated with poor efficiency if the heat generated by the PTC element is removed only inadequately.

SUMMARY OF THE INVENTION

The present invention proposes to form the heating element casing by way of an injection molded plastic frame which encloses the insulation layer only at the edge. The plastic frame forms mutually oppositely disposed frame openings and surrounds the insulation layer and preferably a very narrow edge region of the PTC element, but does not completely cover the PTC element. Disposed behind the frame openings defined by the plastic frame are the main side surfaces of the PTC element. It is understood that the PTC element is presently on its main side surfaces covered entirely or predominantly by the insulation layer which regularly projects over the PTC element.

The PTC heating element according to the invention can be energized in a conventional manner. Sheet metal strips rest on the mutually opposing main side surfaces of the PTC element and are preferably formed integrally with the contact strips of the electrical plug connection. These contact plates can completely or partially cover the main side surface of the PTC element. The insulation layer generally directly abuts the contact plate on the side opposite to the main side surface of the PTC element.

The injection-molded positioning frame is usually produced by overmolding the insulation plates with the PTC element disposed between the insulation plates. The plastic frame is connected in a material-fit and/or positive-fit manner to the insulation plate and the at least one PTC element between the two insulation plates. The plastic frame is preferably configured as a single-piece component. The plastic frame preferably defines the outer circumferential surface of the PTC heating element, which protrudes only on a predetermined side through the two contact strips. This side is the connection side of the PTC heating element for connecting a control or connection circuit board. On this side, the plastic frame can form a plug element with the frame material itself, preferably the male plug element of a plug connection. The plug element is there configured such that the PTC element can be mechanically attached in a plug element holding fixture, i.e. the attachment of the PTC element, also in the insertion direction, is effected solely by the configuration of the heating element casing. The PTC element can be held in a holder of the plug connection solely due to the plug connection, for example, a partition wall separating a circulation chamber from a connection chamber. The plastic frame can be made of silicone.

In order to form this plug connection as fluidically tight as possible, and also in view of sealing the PTC element well within the heating element casing, the plastic frame is according to a preferred development of the present invention formed from elastomeric plastic material. This plastic material is preferably no TPE but a crosslinked elastomer. Due to the elasticity of the elastomeric plastic material, the plug connection can be configured such that good holding forces arise and furthermore a firm seal, for example, a fluidically tight seal is produced in the region of the plug connection.

In the solution according to the invention, the insulation layer preferably directly abuts against the PTC element or is applied immediately thereonto, for example, as a coating. In contrast to previously known prior art according to EP 2 607 121 A1, the electric supply of the PTC element is effected mainly or predominantly via the face side, i.e. via mutually oppositely disposed edges of the PTC element which usually extend at a right angle to the main direction of extension of the insulation plate.

The PTC heating element according to the invention is generally an independent element to be connected to a partition wall of a heating device. The plastic frame regularly forms the sole and single casing of the PTC heating element, which is protruded only by the plug connections. Beyond that, the plastic frame commonly determines the outer dimensions of the PTC heating element according to the invention.

In this preferred embodiment, the insulation layers are preferably exposed in oppositely disposed frame openings, i.e. together with the material of the plastic frame form the outer surface of the PTC heating element. The two main side surfaces of the at least one PTC element within the heating element casing are covered by this insulation plate and preferably directly abut thereagainst.

The insulation layers can be formed from a single-layer or multi-layer insulation plate covering substantially the entire main side surface of the PTC element, regularly overlapping it, i.e. projecting over the PTC element at least on one side, preferably on several sides and, particularly preferably, entirely. The insulation layer can be formed, for example, by a combination of a ceramic plate and a plastic plate. However, the insulation layer can also be formed, for example, by coating the PCT element with electrically insulating material. In this case, the PTC element forms the substrate, and the outer surface of the insulation layer is usually exposed within the plastic frame so that a good heat output of the heat generated by the PCT element arises. An example of the coating is a ceramic coating which is applied by way of PVD or CVD onto the PTC element as a substrate. An insulation layer applied as an insulating coating onto the main side surface of the PTC element can be combined with an insulation plate made of ceramic and/or plastic material. Energizing the at least one PTC element is effected in a manner known per se, preferably via a sheet metal strip. The latter, as an integrally formed component, forms both the contact strip as well as the electrode which is electrically connected to the PTC element. This electrode is not regularly the metallization applied by PVD or CVD onto the surface of the PTC element and adhering thereto. It is part of the PTC element. For contacting, the sheet metal strip has an electrically conductive contact ridge which bears against the PTC element and which is commonly extended in the direction of longitudinal extension of the contact ridge by the contact strip, which projects beyond the heating element casing on the outside. All remaining parts of the PTC element are either sealed by overmolding with the plastic material or provided within the frame opening.

For producing the PTC element according to the present invention, the sheet metal strip is bonded in an electrically conductive manner to the PTC element on oppositely disposed edge surfaces. It is also possible for several PTC elements to be bonded to the sheet metal strip in this manner. The PTC elements can be provided spaced from one another in order to avoid overheating in the center region of the PTC heating element. However, the sheet metal strip has a somewhat smaller thickness than the PTC element at least in the region of the ridge. In this way, an insulation plate is placed on opposite main side surfaces of the PTC element(s).

The insulation layer is or preferably comprises an insulation plate, for example, a ceramic plate, since the latter exhibits relatively good thermal conductivity. The insulation plate is preferably placed in such a way that it projects over the PTC element(s) over the entire circumference and partially covers the sheet metal strip at those locations where it is located. The insulation plate can be connected to the sheet metal strip and/or the PTC element by adhesive bonding or be temporarily fixed thereto. The unit thus prepared is placed in an injection mold, in the mold cavity of which the main side surfaces of the insulation plate are clamped substantially between the tool halves. Only an edge region for the formation of the plastic frame remains exposed as a circumferential annular channel circumferentially around the PTC element and the sheet metal strip. Plastic material, preferably elastomeric plastic material, is then injected into this annular channel where it cross-links and thus hardens or cures. After sufficient stiffness of the plastic material has been obtained, the finished product is removed from the injection mold. For gentle sealing of the main side surfaces of the insulation plate, the injection mold can have surfaces in the closed state which interact with the insulation plate and which are formed from soft, preferably soft-elastic material, for example duroplastic material. Injection-molding the material forming the plastic frame takes place at relatively low pressures.

The plastic frame of the present invention usually circumferentially surrounds and thus encloses the insulation layers. While the mayor surface portion thereof is exposed within the two frame openings, the edges, i.e. longitudinal edges or rims are directly contacted and thus sealed by the material forming the plastic frame. Thus, the insulation layers and also the contact plates as well as the one or plural PTC elements are sealed within the plastic frame. The plastic frame water tightly abuts against the insulation layers. A water type seal is facilitated by use of an elastomeric plastic material used to form the plastic frame.

According to a preferred development of the present invention, the plastic frame is provided with a tapered abutment ridge on its outer side. This abutment ridge is formed to be tapering in the thickness direction of the plastic frame. The abutment ridge is commonly provided with at least on a frame tie of the plastic frame. Particularly preferably, the abutment ridge is provided on three successive outer sides or frame ties of the plastic frame. On the side of the plastic frame which is disposed opposite to the contact surfaces, the bottom abutment ridge forms a seal against the base of a heating device casing. The edge-side abutment ridges, which extend at a right angle thereto, serve to seal against a lateral wall of the heating device casing. The PTC elements can be provided in an alternately staggered manner so that each first PTC heating element abuts against, for example, a left side on the heating device casing, whereas every second PTC heating element abuts against the opposite right casing wall. In this manner, a meandering flow channel is formed in a simple manner. The edge-side abutment ridges seal the PTC heating element against the heating device casing. The abutment ridge is preferably formed as one piece, i.e., is an integral component of the injection-molded plastic frame. In particular, the lower abutment ridge can also be used as a compression element in order to secure a specific installation position by elastic pretensioning force after installation of the PTC heating element according to the invention into the heating device casing. This securing can be mechanical securing for mechanically fixing the PTC heating element to the heating device casing. However, the pretensioning force can also or additionally provide a reliable contact of the contact strips in that the PTC heating element is pretensioned.

The present invention provides the possibility of economically manufacturing a PTC heating element by preassembling the contact strips together with the electrodes and the at least one PTC element, and inserting them, covered by insulation plates on opposite main side surfaces of the PTC element, into an injection mold in which the plastic frame is formed. The latter is preferably formed from elastomeric material so that the plastic frame can also form a sealing device for a plug connection, the male plug element of which is preferably formed by the PTC heating element itself. The elastomeric plastic material further has the advantage that the plastic frame seals the insulation plate and possibly the sheet metal strips for energizing the PTC element (s) in a permanently elastic manner. Since the insulation plate preferably abuts directly against the PTC element and energizing the PTC element occurs on the face side, the heat generated by the PTC element is optimally decoupled. The PTC heating element is light-weight. It can be produced economically. The PTC heating element of the present invention is, in particular, a PTC heating element for a water heater, as is known, for example, from EP 2 797 381

A1 and which comprises a circulation chamber, which is configured to be fluidly tight, in particular watertight, and in which the liquid to be heated can circulate, which is separated by way of a partition wall from a connection chamber in which the contact strips of the PTC heating element are exposed. Preferably, several PTC heating elements are provided as part of this electric heating device. By selecting elastomeric plastic material for forming the plastic frame, the PTC heating element according to the invention can be inserted into the partition wall in order to arrange the contact strips in the connection chamber and to seal the circulation chamber against the connection chamber due to the plug connection. The plug connection also allows the PTC heating element to be held in the plug-in direction, so that the partition wall can first be fitted with all the PTC heating elements in order to handle the unit thus preassembled and to finally close the heating device casing including the PTC heating element(s).

BRIEF DESCRIPTION OF THE DRAWINGS

Further details and advantages of the present invention shall become apparent from the following description of an embodiment in combination with the drawing, in which:

FIG. 9 shows a perspective and partially exposed side view of the second embodiment with a shielding provided on the plastic casing;

FIG. 16 shows a perspective sectional view through the partition wall of the further embodiment.

DETAILED DESCRIPTION

1. Basic Configuration of the Heating Device

Figure 1:
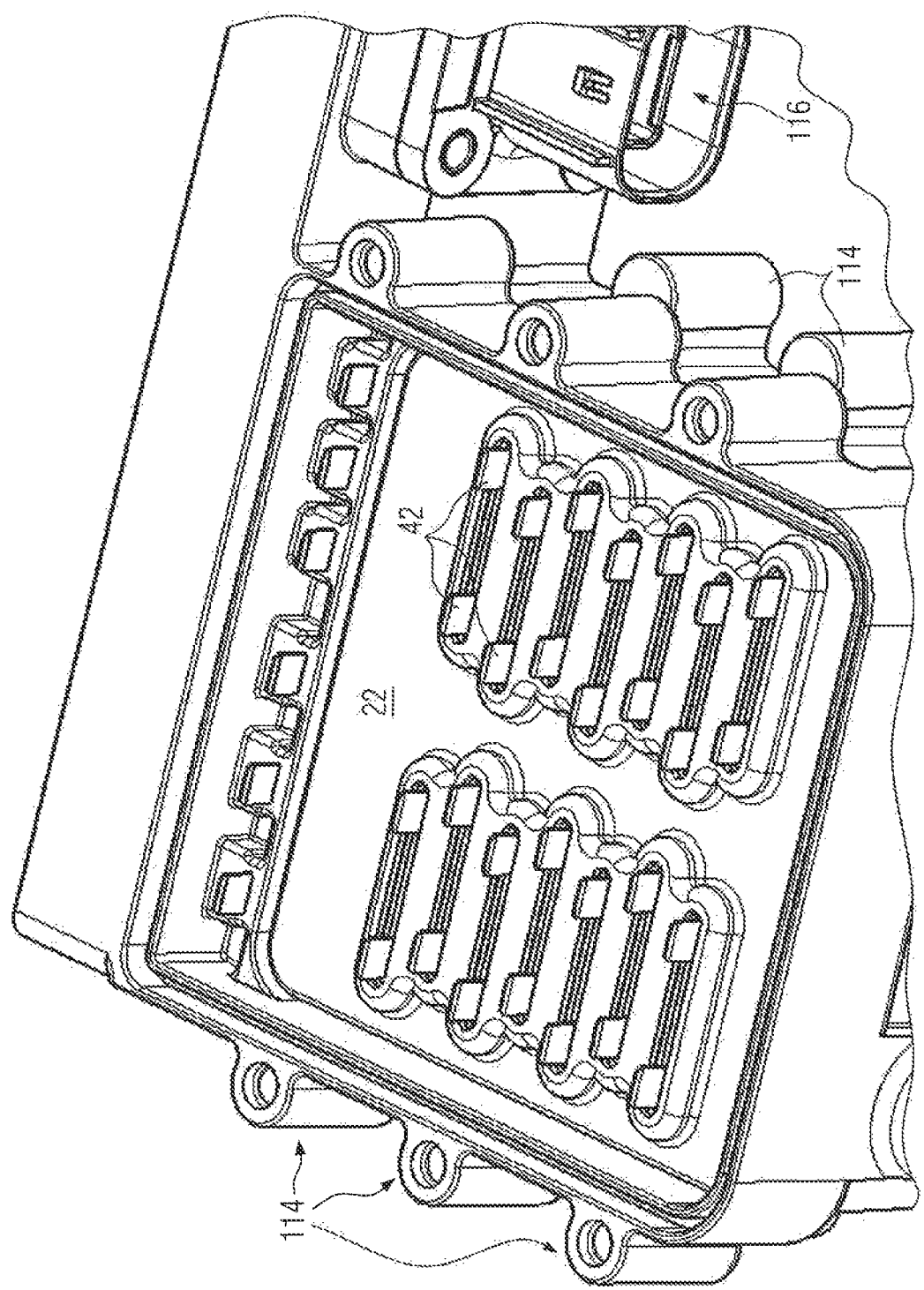
FIG. 1 shows a perspective top view onto a first embodiment of a casing.

FIG. 1 shows a perspective top view of a casing, designated by reference numeral 2, of an electric heating device configured as a water heater. The casing 2 has a casing tub element 4 made of plastic material. This plastic material is presently duroplastic material. The casing 2 forms an inlet port 6 and an outlet port 8 which are presently embodied formed integrally on the casing tub element 4. The ports 6, 8 are designed as hose connection ports and form an inlet opening 10 and an outlet opening 12, respectively, to a circulation chamber designated by reference numeral 14. The circulation chamber 14 is divided into two heating chambers, of which only the heating chamber 16 shown in the front of the representation can be seen in FIGS. 1 and 2. The circulation chamber 14 is divided by a dividing wall 20, which is formed integrally on the casing tub element 4 and protrudes inwardly from the base 18 thereof, and which is continued by a further dividing wall 24 identified by reference numeral 24 and formed on a cover plate designated by reference numeral 22. On the side disposed opposite to the two nozzles 6, 8, the two heating chambers 16 are connected to one another by way of a connection channel which can be seen in the second embodiment of a casing 2 according to FIG. 5 and is designated there by reference numeral 26. This connection channel 26 is separated from the heating chamber 16 by a channel wall segment 28, which is integrally formed on the cover plate 22 and extends at a right angle to the partition wall 20, and a channel wall segment 30 which projects from the base 18 of the casing tub element 4.

The cover plate 22 is made of plastic material. In the present case, the cover plate 22 is made of duroplastic material. In principle, the use of duroplastic material for producing the casing 2 or parts thereof has the advantage that duroplastic material exhibits relatively high temperature stability of about 150° C. and also shows no brittleness at temperatures of −40° C. This results in better temperature resistance for a casing formed entirely or partially from duroplastic material, for requirements which arise during heating operation and when operating vehicles in arctic regions. However, duroplastic material is also preferable over thermosetting materials because duroplastic material has better resistance against leakage current than thermosetting material.

Figure 4:
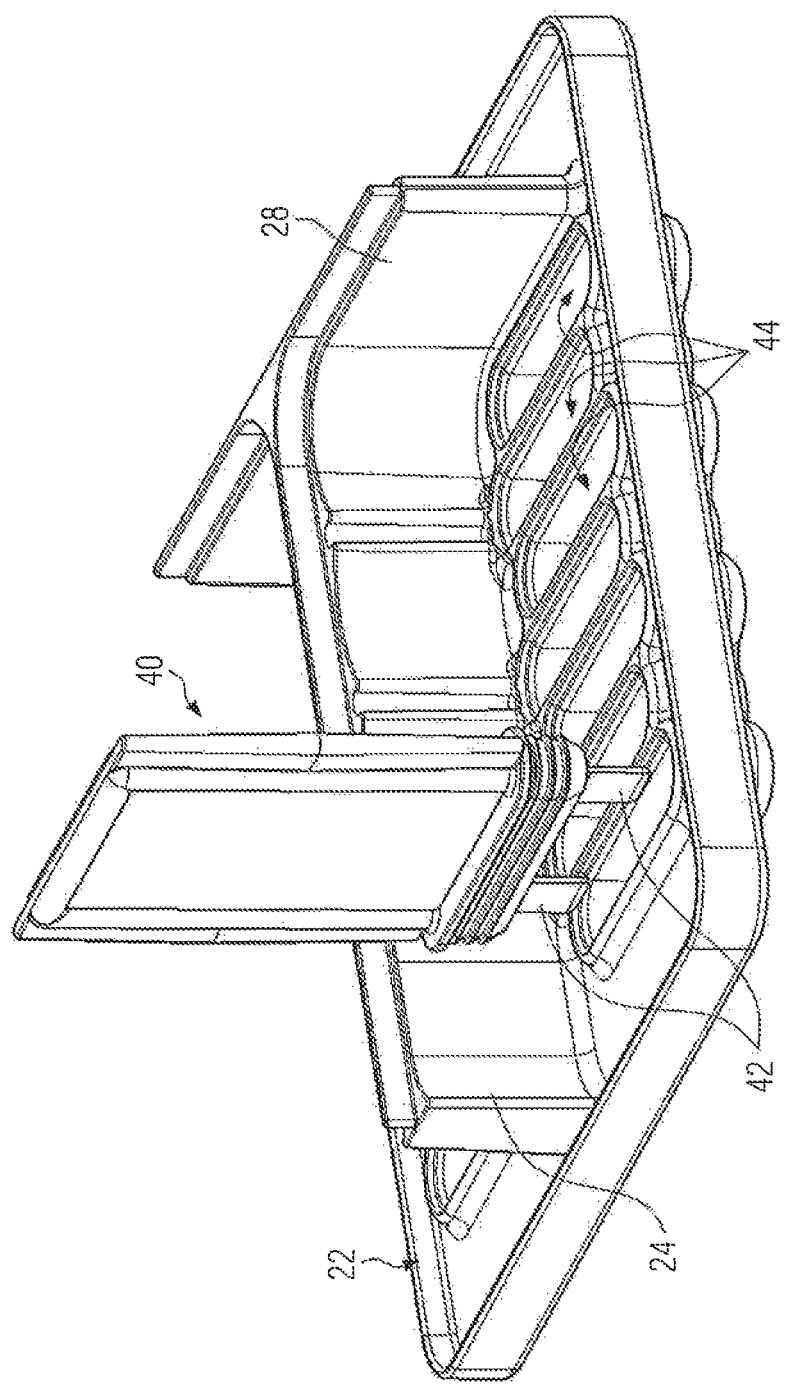
FIG. 4 shows the cover plate shown in FIG. 3 when being fitted with a PTC heating element.

FIG. 4 shows the cover plate 22 without the casing tub element 4. The cover plate 22 has a circumferential edge 32 which interacts with a circumferential groove 34 formed on the casing tub element 4. This groove 34 is filled with adhesive, in the present case epoxy glue, before the edge 32 penetrates into the groove 34 in order to adhesively bond the cover element 22 to the casing tub element. The segments 24 and 28 are joined to the corresponding wall elements 20 and 30, respectively, of the casing tub element 4 in the same way. The circulation chamber 14 is then sealed in a fluidly tight manner between the base 18 of the casing tub element 4 and the cover element 22 and circumferentially surrounded by walls formed by the casing tub element 4 and extending at a right angle to the base 18 thereof.

Figure 3:
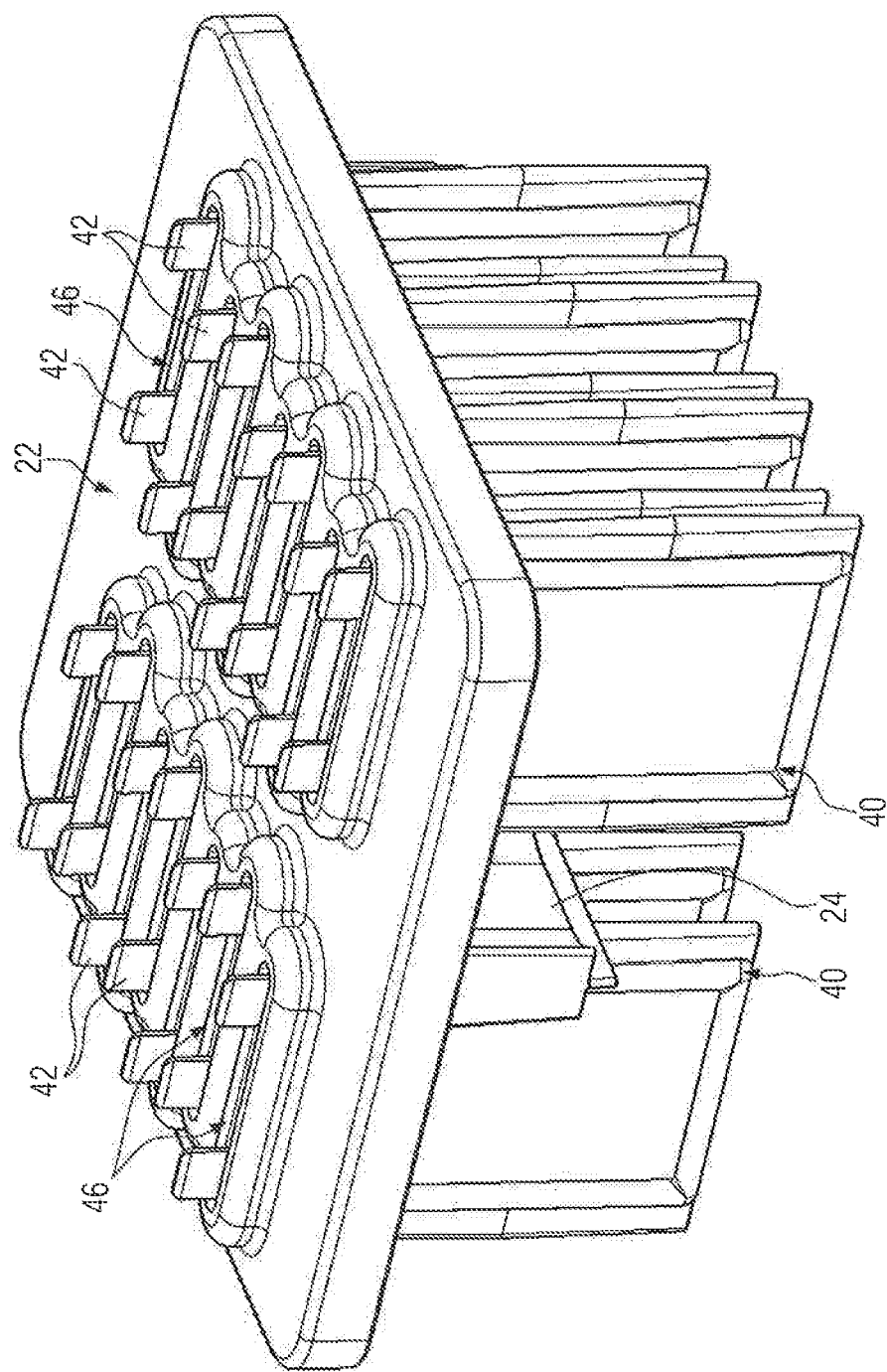
FIG. 3 shows a cover plate 22, provided in the first embodiment, in isolated representation together with PTC heating elements.

Prior to assembly, the cover element 22 is fitted PTC heating elements 40 in the manner shown in FIGS. 3 and 4. For this purpose, the PTC heating elements 40 are inserted on the connection side, i.e. where the PTC heating elements 40 each have two contact strips 42, into female plug element holding fixtures 44 which are integrally formed in the cover plate 22. These plug element holding fixtures 44 are each provided with a longitudinal slot 46 which is penetrated by the contact strips 42 (cf. FIGS. 1, 3). A longitudinal slot 46 is an example of a through-hole opened in the cover plate 22 as an example of an inner wall.

FIG. 4 illustrates the insertion of the PTC heating element 40 into the plug element holding fixture 44. For the plug connection established after insertion, the PTC heating element 40 has a sealing collar 48 which is configured to be adapted to the dimension of the plug element holding fixture 44 and is formed from elastomeric material which is sealingly injected into the plug element holding fixture 44, so that the slots 46 are sealed fluidly tight against the circulation chamber 14. Furthermore, by injecting the material forming the sealing collar 48, the PTC heating element 40 is held frictionally engaged within the plug element holding fixture 44, namely, also in the direction of insertion, which corresponds to the direction of longitudinal extension of the contact strips 42. Joined in this manner, the PTC heating elements 40 adhere to the cover plate 22 even if the latter with the plug element holding fixtures 44 is oriented downwardly, as shown in FIG. 3.

2. Casing Base Member

Figure 5:
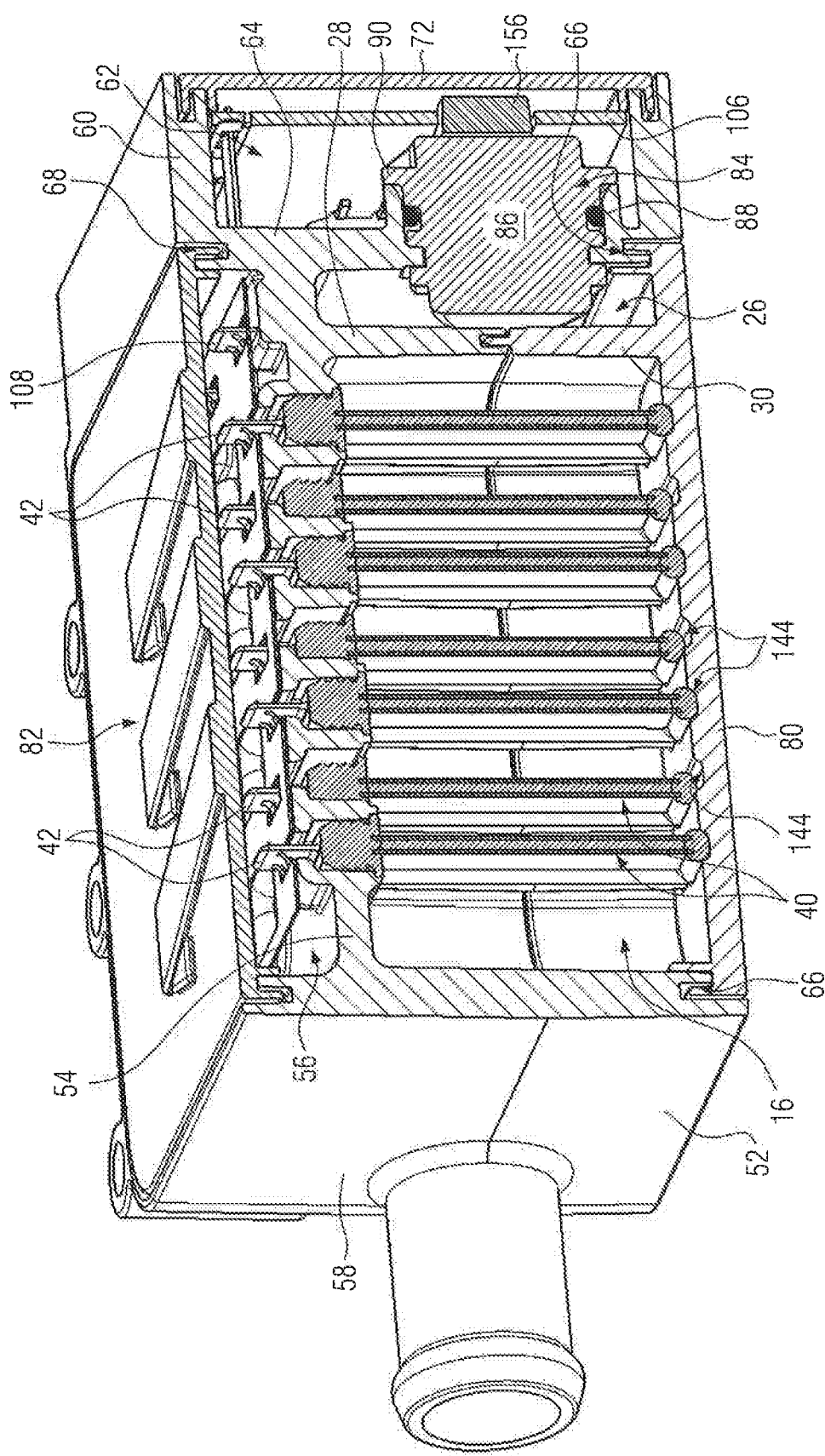
FIG. 5 shows a perspective sectional side view of a second embodiment of the present invention.

FIG. 5 in a sectional view illustrates the nature of an embodiment of a casing base member which is designated by reference numeral 50. The casing base member 50 forms walls that are designated by reference numerals 52 and surround the circulation chamber 16 circumferentially, i.e. the heating chambers 16 and the connection channel 26. The cover plate 22, which is provided as a separate component in the previously described embodiment, is presently embodied integrally with the casing base member 50 and presently also forms a partition wall 54, like in the first embodiment, which separates the circulation chamber 16 from a connection chamber 56 in which presently all contact strips 42 of all the PTC heating elements 40 are exposed. Walls designated by reference numeral 58 and surrounding the connection chamber circumferentially are also formed by the casing base member 50. Finally, in the extension of the ports 6, 8 and in this direction behind the circulation chamber 16 or the connection chamber 56, respectively, walls 60 are formed by the casing base member 50 and surround a control chamber 62 circumferentially. A control chamber base, designated by reference numeral 64, from which the walls 60 rise, is in part formed by one of the walls 52 and one of the walls 58. In a cross-sectional view extending parallel to the direction of extension of the nozzles 6, 8, the casing base member therefore accordingly appears to have an H-shaped cross-section with a U adjoining at one side of the H. The casing base member 50 is made of plastic material and configured as an integrally formed component. The casing base member 50 is presently formed from duroplastic material.

The walls 52, 58, 60 are each provided with a circumferential groove 66, 68, 70 on the face side. The function of these grooves 66, 68, 70 is illustrated in particular by FIG. 6. A cover element 72 to the control chamber 62 is there illustrated, which is configured as a substantially flat plate with a circumferential rim 74. This rim 74 engages in the associated groove 70 and displaces adhesive applied there (in the present case, epoxy adhesive). The rim 74 forms an outer edge of a mating groove 76 which is formed on the cover element 72 and is defined on the inside by an inner ridge 78. A kind of labyrinth seal is formed thereby, into which displaced adhesive can ingress, which has been introduced either into the groove 70 or the mating groove 76 prior to the installation of the cover element 72. Correspondingly, the casing cover 80 to the circulation chamber 14 and 82 to the connection chamber 56, respectively, is formed on the edge side and attached to the casing base member 50 and sealed against it.

Figure 6:
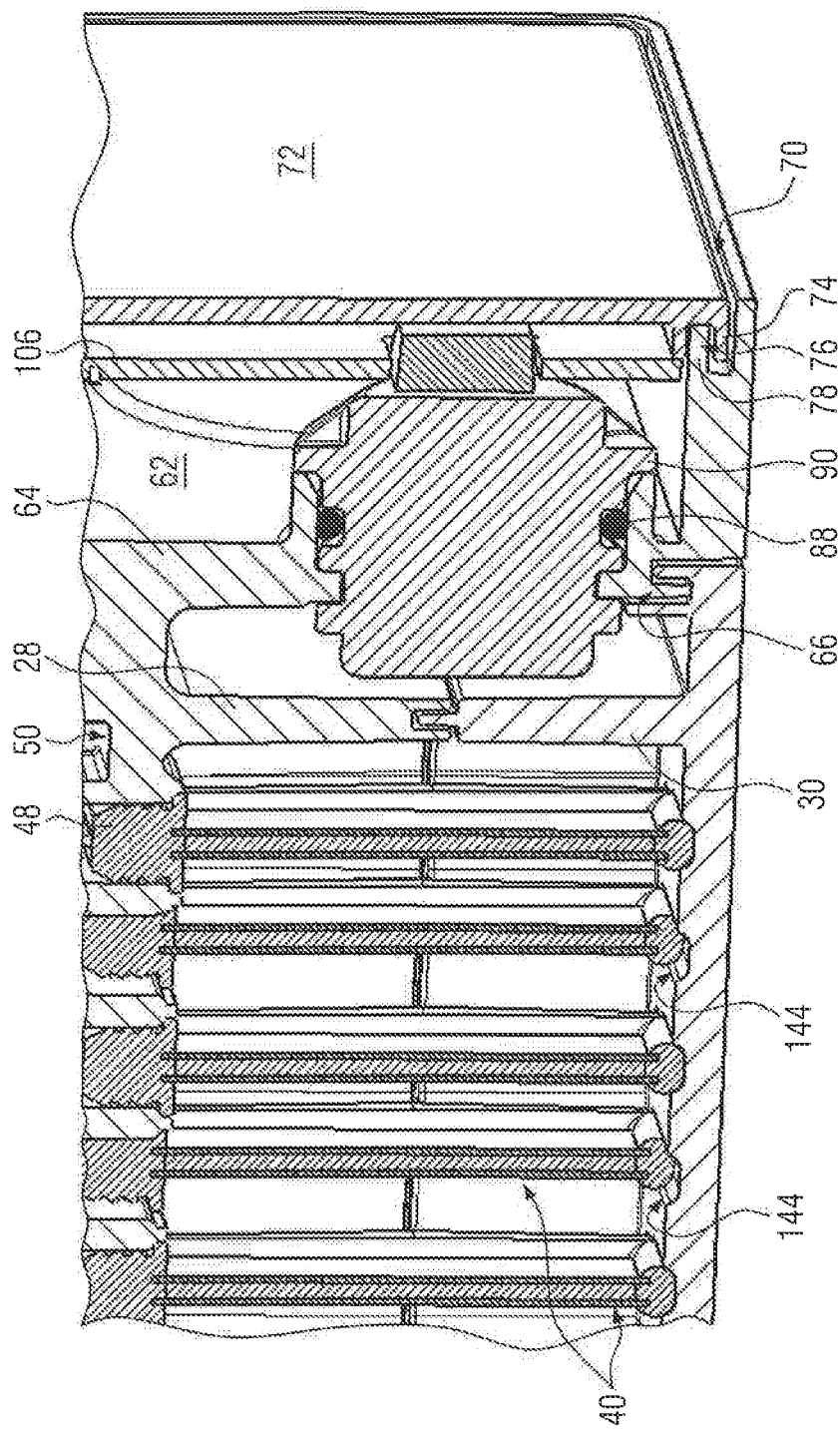
FIG. 6 shows detail VI according to the representation in FIG. 5.

As also illustrated in FIG. 6, the control chamber base 64 is provided with a passage opening 84 into which a cooling element 86 is introduced. A sealing ring 88 is provided between the cooling element 86 and the inner circumferential wall of the passage opening 84 for sealing the circulation chamber 14 against the control chamber 62. On the control casing side, the cooling element 86 forms an annular stop 90 which abuts against the face side end surface of the passage opening 84, which is extended in the direction towards the control chamber 62 as a projecting collar 92 and formed by the material of the casing base member 50.

Figure 7:
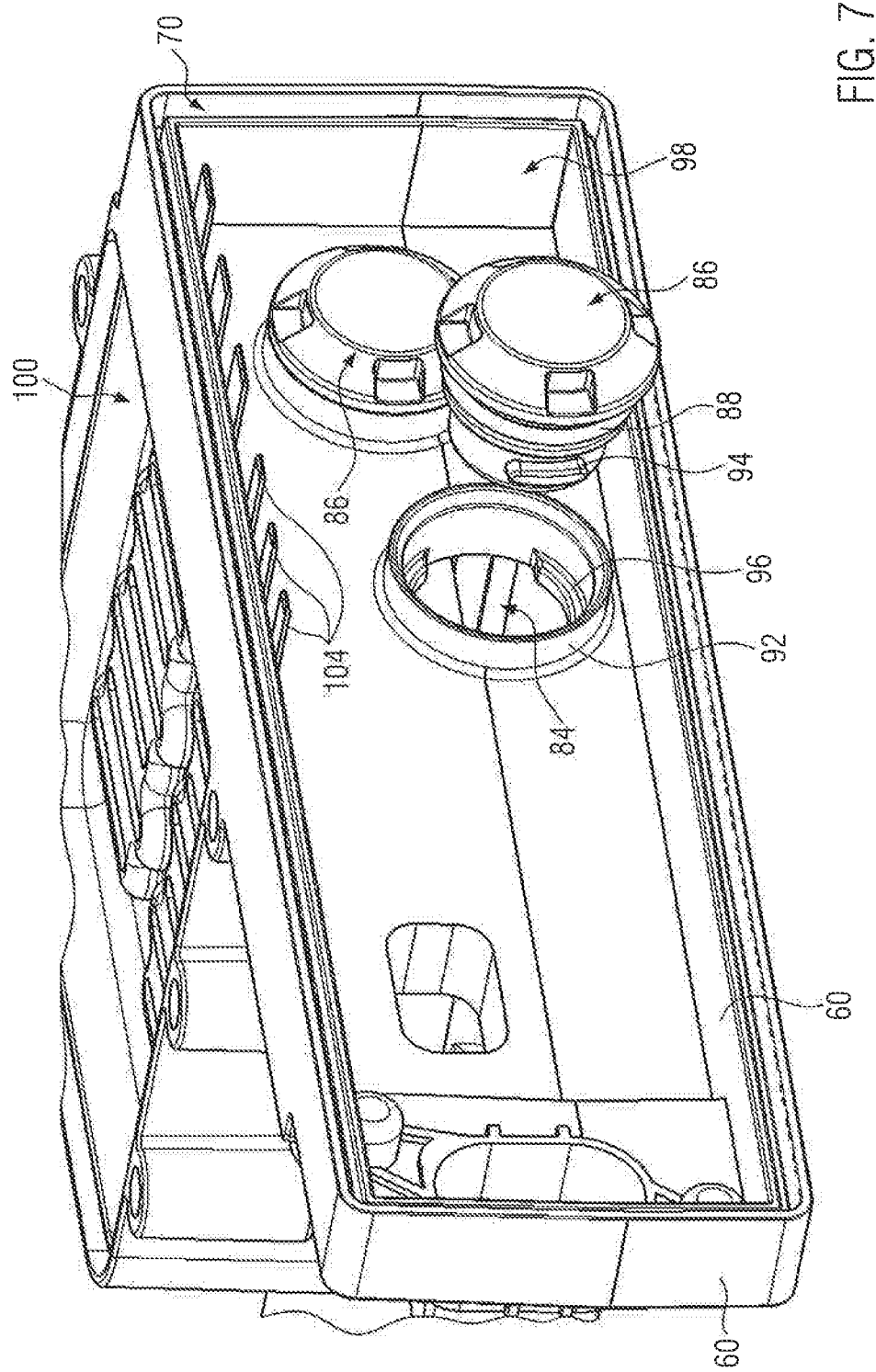
FIG. 7 shows a perspective view into the control tub of the second embodiment.

As shown in FIG. 7, the outer circumferential surface of the cooling element 88, which is formed substantially cylindrical at least in the direction toward the circulation chamber 14, is protruded circumferentially on opposite sides by locking projections 94, which interact with locking catches 96, which at the inner circumference project over the substantially cylindrical passage opening 84 to form a bayonet lock with which the cooling element 86 is fixed with respect to the casing base member 50. The sealing ring 88 can be configured such that it holds this lock subject to axial and/or radial pretension. In addition, the control chamber base 64 can be provided with depressions adjacent to the mouth of the passage opening 84 on the sides of the circulation chamber 14 into which the locking projections 94 engage and which hold the cooling element 86 in a positive-fit anti-rotational manner in order to prevent the bayonet lock 94, 96 from being released unintentionally.

FIG. 7 provides a view into a control casing tub which is formed by the control chamber base 64 and the walls 60 and which is closed by the cover element 72 in the final assembled state.

FIG. 5 shows, above the partition wall 54, a connection tub 100 formed by the partition wall 54 and the walls 58. On the side which is in the representation according to FIG. 5 located therebeneath, a circulation pan 102 is formed by the partition wall 54 and the walls 52 through the casing base member 50. The casing base member 50 forms substantially all the chambers 14, 56, 52, which only need to be covered by the cover elements 72, 80, 82, in order to create an electric heating device which is operational and formed as a lightweight plastic part.

3. Sealingly Overmolded Current Bar

Figure 8:
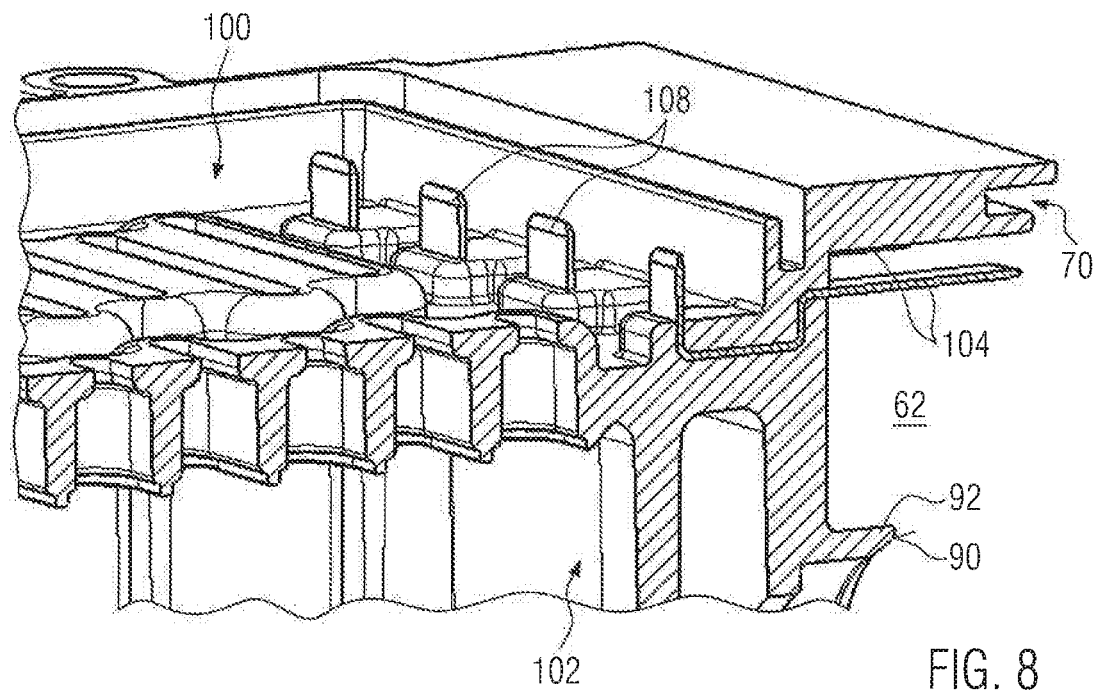
FIG. 8 shows a perspective longitudinal sectional view taken along line VII-VII according to the representation in FIG. 7.

FIG. 8 illustrates a current bar 104 which is provided as a conductor track between the connection chamber 56 and the control chamber 62. The current bar 104 is bent twice by 90° in opposite directions at the height of the control chamber base 64 and within the latter. One end of the current bar 104 located within the control chamber 62 is configured as a plug connection for a printed circuit board assembly 106 provided within the control chamber (cf. FIG. 6). The other end is provided within the connection chamber as a connection strip 108 for a distributor plate provided inside the connection chamber and omitted in the previous figures. The distributor plate can be configured like in EP 2 505 931 A1. Several connection strips 108 are exposed within the connection chamber 56 by several current bars 104 provided in an identical manner. The connection strips 108 extend parallel to the contact strips 42 to the PTC heating elements. The distributor plate can there be lowered into the connection chamber from above in order to contact all contact and connection strips 42, 108.

4. Shielding

The sheet metal strips 128 are formed from punched sheet metal and represent embodiments of contact plates.

FIG. 9 shows a partial sectional view of the casing 2 described above. This plastic casing 2 is surrounded by two metal shells 110, 112 which form a shielding for the electric heating device so that electromagnetic radiation cannot be emitted from the latter. The dividing plane of the metal shells 110, 112 is located approximately at the center height of the two nozzles 6, 8. The metal shells 110, 112 substantially completely surround the casing 2. Only attachment projections 114 formed on the plastic casing 2 project outwardly beyond the metal shells 110, 112 and through recesses 115 formed on the metal shells 110, 112 and through the shielding formed thereby. Furthermore, connector casings protrude which are designated by reference numerals 116 and 118, where the connector casing 116 is presently provided for the high-voltage power current and the connector casing 118 for the low-voltage control lines. The embodiment shown in FIG. 9 allows for the attachment of the casing 2 by way of the attachment elements 110 made of plastic material. In using them, the requirement to fasten the casing 2 at the desired location within a motor vehicle can be complied with in a simple manner. In FIG. 9, the metal shells 110, 112 are formed to be substantially end-to-end. They can just as well be formed from a perforated plate without the effect of the metal shells 110, 112 as an EMC protection being lost.

5. PTC Heating Element as a Frame Element

Figure 10:
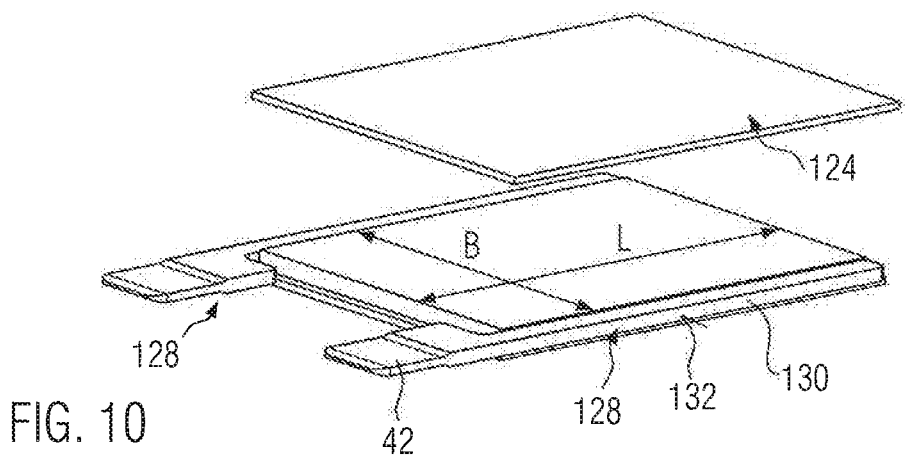
FIG. 10 shows a perspective side view of parts of the PTC heating element.

FIG. 10 shows a PTC element 120 which is provided with an insulation layer 124 on its oppositely disposed main side surfaces 122. The insulation layer 124 is presently a ceramic plate made from aluminum oxide. However, it can also be applied as a coating onto the PTC element 120 or as a combination of a coating with a single or multiple layer insulation coat. The PTC element 120 is designed as a platelet having a width B or a length L, respectively, that is greater by the factor of at least 10 than the thickness D which corresponds to the distance between the two main side surfaces 122. Sheet metal strips 128 substantially extending in the direction of the length L are provided on mutually oppositely disposed face side surfaces 126 and are glued to the PTC element 120 and are connected in an electrically conductive manner to a surface metallization of the PTC element 120, which can be applied as a protection by way of PVD or CVD. These sheet metal strips each form conductor tracks to different polarities with which the PTC element 120 is energized. The sheet metal strips 12 consist of a contact ridge 130 which is relatively narrow and the contact strip 42 which is widened in relation to the contact ridge 130 in the direction of the width B.

Figure 11:
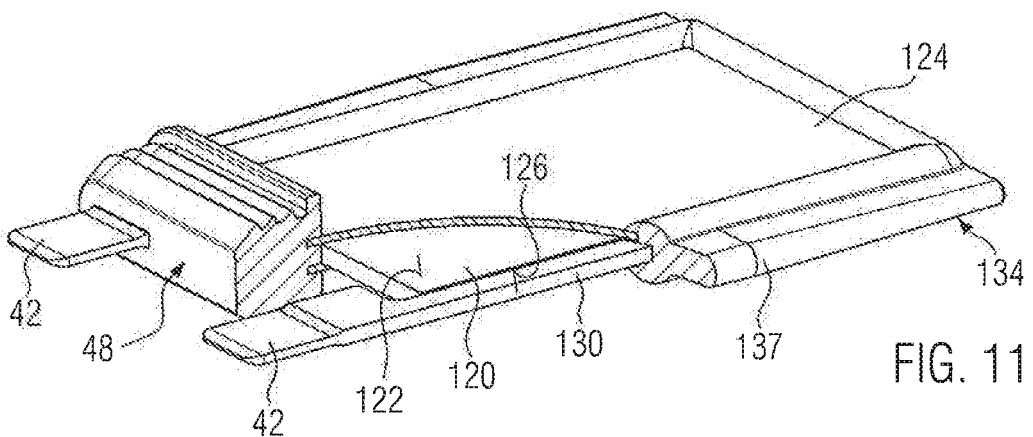
FIG. 11 shows a partially exposed perspective side view of parts of the PTC heating element.
Figure 12:
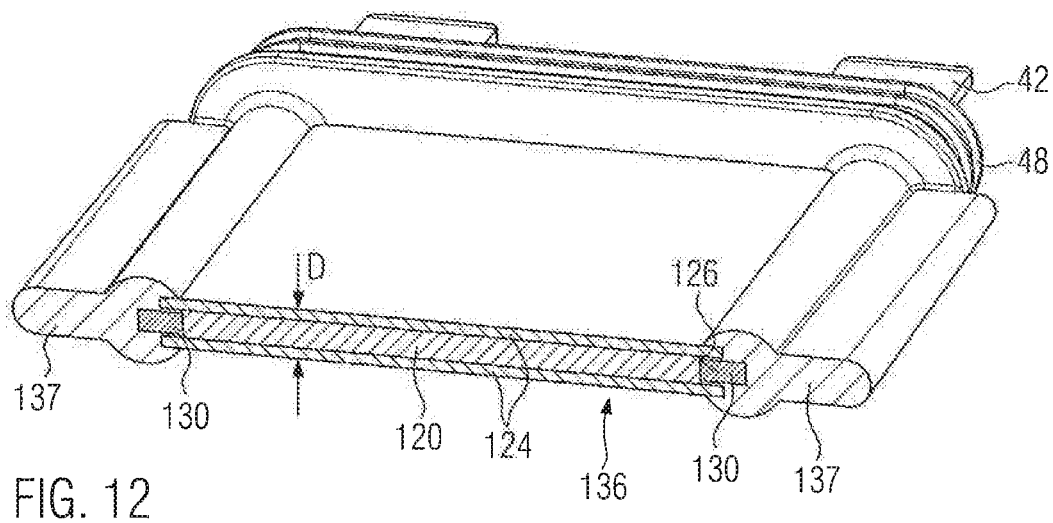
FIG. 12 shows a perspective cross-sectional view of the PTC heating element.

The contact ridges 130 presently form the electrodes to the PTC element are electrically connected to the metallization of the PTC element 120. The thickness of the contact strip 42 is smaller than the thickness of the contact ridge 30. Its thickness is in turn smaller than the thickness D of the PTC element. The sheet metal strip 128 is provided such that it does not project over the main side surfaces 122 of the PTC element 120 at any point. As can be seen in particular in FIGS. 11 and 12, the insulation layers 124 project laterally beyond the PTC element 120. The insulation layers 124 accordingly have a base area which is larger than the base area of the main side surfaces 122 of the PTC element 120. Accordingly, the outer edges of the insulation layers 124 receive the contact ridge 130 between themselves on both sides (see FIG. 12). Each contact ridge 130 is glued to one of the oppositely disposed face side surfaces 126. The insulation layer 124 is likewise glued to the PTC element 120. The insulation layer 124 abuts directly against the PTC element. One of the insulation layers 124 therefore directly contacts the associated main side surface 122 of the PTC element.

The outer side of the respective sheet metal strips 128 is completely flat and extends strictly in the direction of the length L. The contact strips 42 are in the width direction formed larger than the contact ridge 130 and project over the PTC element 120 towards each other (cf. FIG. 10). The contact strip 42 is also thinner than the contact ridge 130.

The region of the sheet metal strip 128, which is broadened as compared to the contact ridge 130, is received in a heating element casing 134 surrounding the PTC element 120 in a frame-like manner. This plastic frame 134 encloses the circumferential edges of the insulation layers 124. The edge surfaces 132 are also sealed by the material forming the plastic frame 134. The plastic frame 134 is formed as an elastomeric plastic frame 134 by overmolding elastomeric material. With the finished PTC heating element 40, only the contact strips 42 project over the plastic frame 134 on a face side. All other functional parts of the PTC heating element 40 used for heat generation and current conduction are accommodated within the plastic frame 134. As illustrated in particular by FIG. 12, the PTC element 120 with its oppositely disposed main side surfaces 122 is located behind frame openings which are designated by reference numeral 136 and are formed by the plastic frame 134. These frame openings 136 are covered by the insulation layer 124. Almost no covering of the plastic frame 134 with the main side surfaces 122 of the PTC element presently arises so that this exposes approximately 100% of its main side surfaces 122 behind the frame openings 136.

The frame ties of the plastic frame 134 protruding at a right angle from the sealing collar 48 are each provided with abutment ridges 137 on the edge side. The abutment ridges 137 are designed in the manner of tapered slats which have a thickness that tapers as compared to the thickness of the plastic frame 134. As can be seen, for example, in FIG. 6, the PTC heating elements 40 are each provided slightly staggered one behind the other such that each first PTC heating element 40 abuts against the wall of the casing 2 on the left side and is sealed there by the abutment ridge 137 which sealingly abuts against a border wall of the circulation chamber 14. Therefore, no fluid can flow past the PTC element 40 on this side, but it can flow past the PTC heating element that is in the flow direction located upstream or downstream. The latter, in turn, with its abutment ridge 137 abuts against the wall defining the circulation chamber 14 the opposite side and redirects the flow channel there. A meandering flow channel is thus formed by the alternating arrangement of the PTC heating elements 40.

6. Plug Connection

Figure 13:
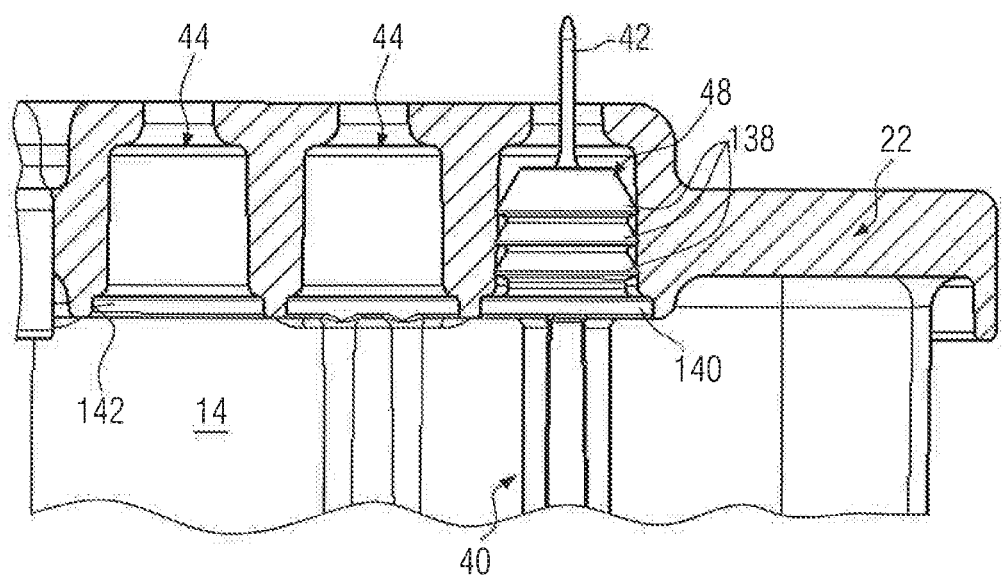
FIG. 13 shows a longitudinal sectional view through the cover plate according to FIGS. 3, 4 with a single PTC heating element accommodated therein.

The plastic frame 134 further forms the previously described sealing collar 48, which is provided with segments 138 tapering toward the free end of the contact strips 42 (cf. FIG. 13). Three of these segments 138 are presently provided one behind the other in the direction of longitudinal extension of the contact strip 42. An annular stop 140 is formed by the heating element casing 134 between the frame opening 136 and these segments 138. As illustrated by FIG. 13, this stop is in sealing abutment against a cylindrical mating surface 142 formed by the female plug element holding fixture 44.

Figure 2:
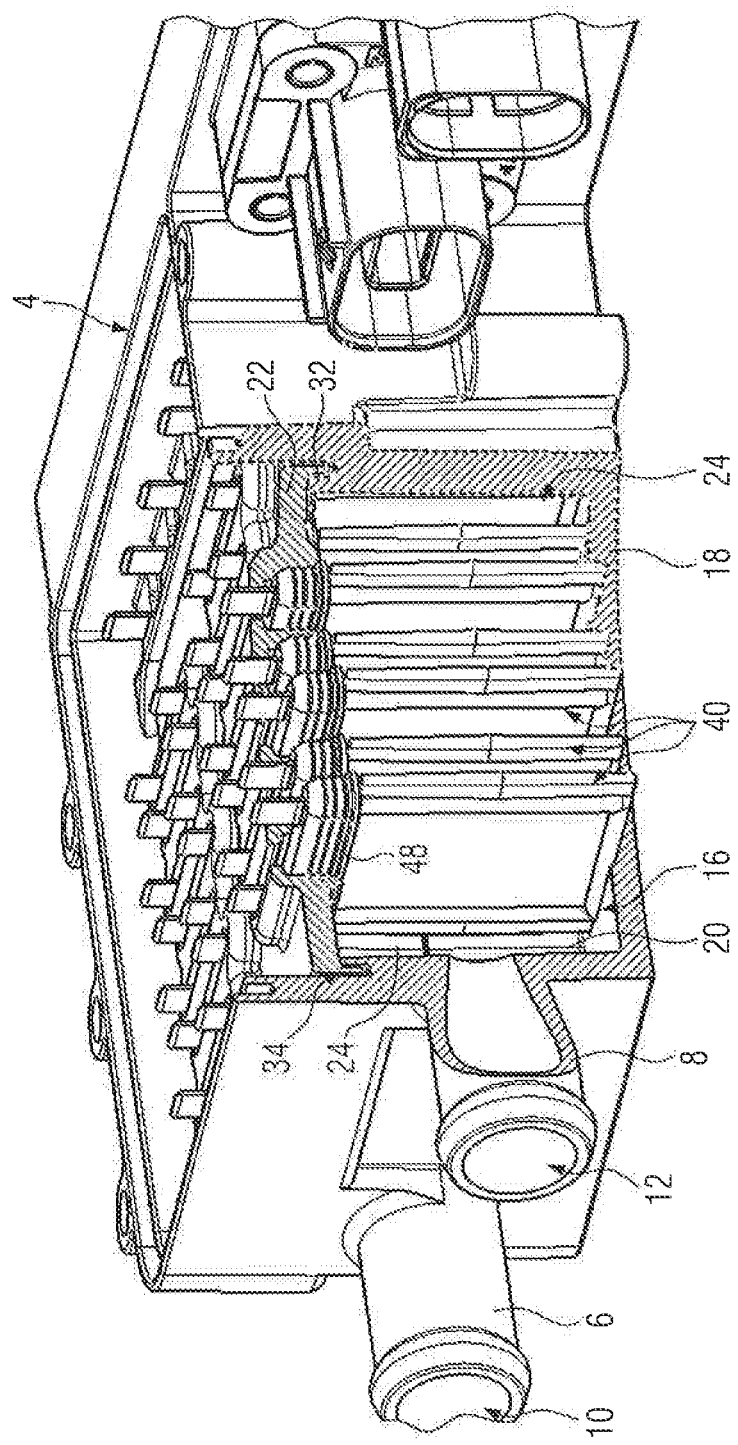
FIG. 2 shows a perspective side view of the embodiment shown in FIG. 1.

As illustrated in FIGS. 2 and 5, the oppositely disposed side of the PTC elements 40 abuts the base 18 of the casing 2 after installation. Provided in the base 18 for exact positioning are depressions 144 in which the face side surfaces of the heating element casing 134 are received. This ensures exactly right-angled positioning of the PTC heating elements relative to the partition wall 54. Furthermore, a holding force is generated which prevents the PTC heating elements 40 plugged into the partition wall 54 from dropping out of the female plug element holding fixtures 44 during operation and in particular due to the vibration of the vehicle. This base-side abutment of the PTC heating elements 40 also ensures the contact pressure within the plug contact of the PTC heating elements, so that they securely and also permanently seal the longitudinal slots 46 to the connection chamber 56.

It is understood that the depressions 144 can also be dispensed with. Similar to the abutment ridges 137, an abutment ridge 137 can also be provided on the underside of the plastic frame 134 disposed opposite to the sealing collar 48 and seal there and be supported and in abutment against the base 18 of the casing 2 subject to elastic compression. This not only provides a fluidly tight seal between the underside of the PTC heating element 40 and the casing 2. Rather, a compressive force is also generated due to the compression of the abutment ridge and holds the PTC heating element 40 captively in the female plug element holding fixture 44 even when strong vibrations act upon the electric heating device.

7. Electric Connection of the PTC Heating Elements

Figure 14:
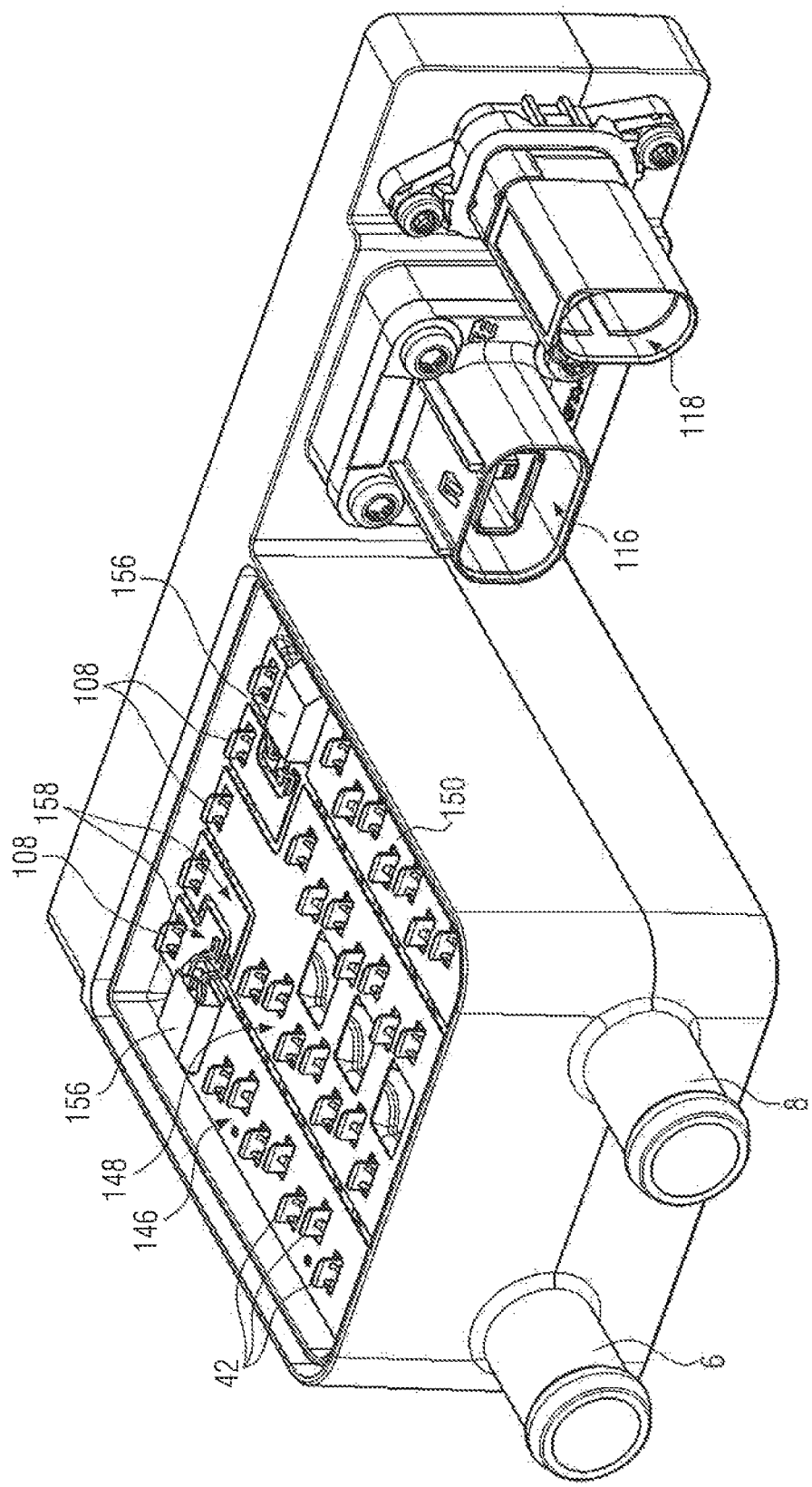
FIG. 14 shows a perspective side of a further embodiment with the casing cover removed.
Figure 15:
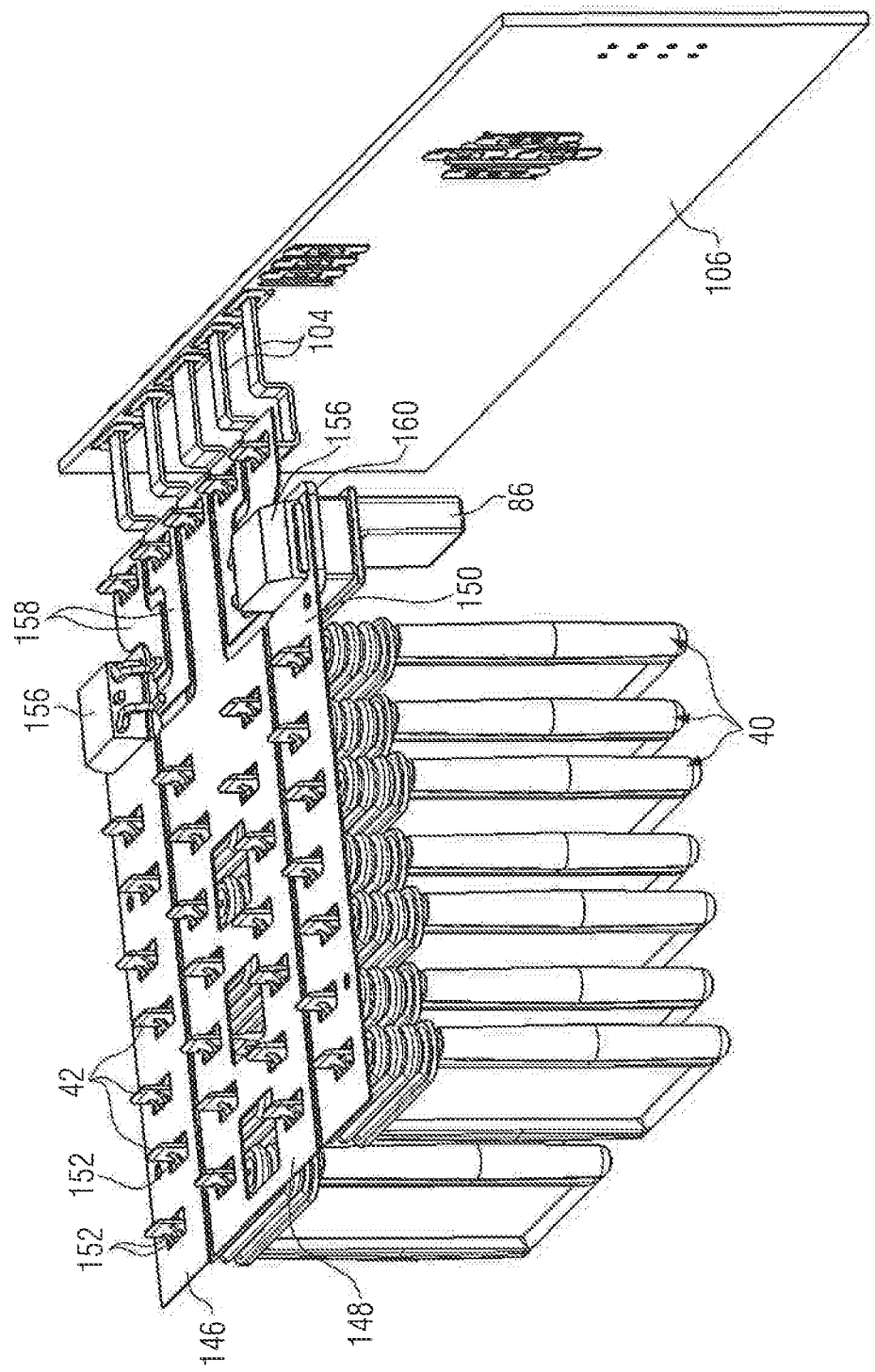
FIG. 15 shows a view similar to FIG. 14 of the further embodiment without the casing cover.

FIGS. 14-16 illustrate the electric connection of the PTC heating elements 40 using the example of a further embodiment. FIG. 15 shows the embodiment without the casing 2 and parts thereof, similar to the illustration in FIG. 3. For the electric connection, pieces of punched sheet metal are provided in the connection chamber 56 as current bars 146, 148, 150, comprising contact projections 152 formed by punching and bending which abut against the contact strips 42 subject to elastic pretensioning and contact them. The contact projections 152 project into receptacle openings 154 which are recessed in the sheet metal strips of the current bars 146, 148, 150. The current bar, designated by reference numeral 148, has a corresponding receptacle opening 154 with contact projections 152 for the current bar 104. The current bars, designated by reference numbers 146 and 148, are each equipped with a power transistor 156 which is connected in an electrically conductive manner to the respective current bar 146, 150 and mounted thereon. The power transistors 156 are connected on the input side to conductors 158 which are likewise formed as current bars, and which are again provided with receptacle openings 154 with contact projections 152 for respectively contacting via a current bar 104. Electric conduction within the containment chamber 56 [sic] is effected solely by way of sheet metal elements. These sheet metal elements are equipped exclusively with the power transistors 156 as electric or electronic components. No further electric or electronic components are provided.

As shown in particular in FIG. 16, these metal plates 146, 148, 150, 158 are inserted in a manner electrically insulated from one another into the connection chamber 56 and positioned there. The control signals for actuating the power transistors 146 processed on the circuit board 106 are supplied to the respective power transistor 156 via at least one of the conductors 158.

FIG. 16 illustrates a sectional view at the height of a cooling element, denoted by reference numeral 86 also in FIG. 15. An electrical insulation coat 160 made, for example, of Kapton or a ceramic plate is implemented between the cooling element 86 and the power transistor 156. The current bar 146, 150 provided between this insulation coat 160 and the power transistor 156 results in a certain spread of the heat emitted by the power transistor 156. For this purpose, the current bar 146 or 150, respectively, can be configured to have a greater thickness at least in the region of the power transistor 156. It is equally possible to form the current bar 146 or 150, respectively, from copper and thus from a material that exhibits good thermal conductivity. The sheet metal material can have an increased thickness in the region of the power transistor 156 due to contour rollers.

The current bars 146, 148, 150, 158 can be provided with a crimping tab or the like by way of punching which interacts with the casing 2 to attach the respective current bar 146, 148, 150, 158 to the casing 2, and/or to abut or press the power transistor 146 against the cooling element 86 subject to pretension.

FIG. 16 also shows a variant of the PTC heating element 40. According thereto, the contact strips 42 are received within the plastic frame 134 in an attachment plug 162 formed from a hard plastic component. The contact strips 42 are received in the attachment plug 162 by way of overmolding. The attachment plug 162 is made of hard plastic material with good resistance to leakage current and sparkover. The attachment plug 162 forms a hard core for the male plug element formed by the PTC heating element 40. This attachment plug 162 is merely covered by a thin coating of the soft-elastic material of the sealing collar 48, whereby the compression force formed by the sealing collar 48 within the female plug element holding fixture 44 is increased. The attachment plug 162 can be effected, for example, by overmolding two sheet metal strips 128, each of which individually forms the contact ridges 130 and the contact strips 42 as an integrally formed component. Prepared in this manner and positioned spatially and physically relative to one another, the attachment plug 162 together with the sheet metal strip 128 can be overmolded with the soft-elastic plastic component for forming the plastic frame 134, as described above.

The sealing collar is formed to be elongate also in the variant according to FIGS. 14-16. However, it goes without saying that each individual contact strip 42 can be arranged in a cylindrical sealing collar with a basically circular or oval cross-sectional area. The female plug element holding fixture 44 is then likewise provided with a cross-section that is circular or oval, respectively. Such an embodiment can increase the tightness as compared to the specifically described embodiment. It is understood that polygonal cross-sectional areas are also possible.

FIG. 16 further shows the attachment of the cooling element 86 within the partition wall 54. At the height of the partition wall 54, the cooling element 86 has an attachment collar 164 on its outer circumference which projects beyond the cooling element 86 on the edge side and is sealed in a positive-fit manner by overmolding the plastic material forming the partition 54. The design of the attachment collar 164 incidentally also improves the tightness between the circulation chamber 14 and the connection chamber 56.

According to a variant (not shown), the surface of the cooling element 86 projecting to the connection chamber 56 can also be covered with the plastic material forming the partition wall 54. When the cooling element 46 is overmolded, a thin film can be formed by injection molding between the surface of the cooling element 86 and the interior of the connection chamber 56, via which the power transistor 156 abuts against the cooling element 68 in an electrically insulated manner. This further simplifies production. A separate electrical insulation layer does not need to be provided between the power transistor 156 and the cooling element 86.

We claim:

1. A positive temperature coefficient (PTC) heating element comprising: a heating element casing that fits, as a structural unit, at least one PTC element having two main side surfaces and contact plates that energize said at least one PTC element and that form contact strips for an electrical plug connection in order to electrically connect electrodes that are electrically connected to said at least one PTC element, said at least one PTC element being covered with an insulation layer on each of the two main side surfaces, wherein said heating element casing comprises:

an injection-molded plastic frame which encloses said insulation layers only at edges thereof and which defines oppositely disposed frame openings, behind said frame opening, wherein said at least one PTC element with the two main side surfaces is located, wherein said two insulation layers are exposed in the oppositely disposed frame openings, and wherein said plastic frame is connected, in one or more of a material-fit and a positive-fit manner, to said insulation layers and the at least one PTC element between the two insulation layers.

2. The PTC heating element according to claim 1, wherein each of said insulation layers abuts directly against said PTC element or is provided thereon.

3. The PTC heating element according to claim 1, wherein said PTC element and the insulation layers are connected to said plastic frame by overmolding them onto the material forming said plastic frame.

4. The PTC heating element according to claim 3, wherein the material forming said plastic frame is an elastomeric plastic material.

5. The PTC heating element according to claim 1, wherein each contact strip is formed by a sheet metal strip which comprises a contact ridge abutting against a face side of said PTC element in an electrically conductive manner, and wherein said plastic frame forms an outer circumferential surface of said PTC heating element, and is protruded only on one face side thereof by two contact strips.

6. The PTC heating element according to claim 1, wherein said plastic frame is provided with an abutment ridge on an outer side thereof.

7. The PTC heating element according to claim 6, wherein the thickness of said abutment ridge is lower than the thickness of a portion of said plastic frame defining the frame opening.

8. The PTC heating element according to claim 1, wherein said plastic frame is in contact with said insulation layer.

9. The PTC heating element according to claim 1, wherein the plastic frame provides a watertight seal around the insulation layers.

10. The PTC heating element according to claim 9, wherein main side surfaces of said insulation layers are provided within the oppositely disposed frame openings and are exposed on an outer side of said frame.

11. A positive temperature coefficient (PTC) heating element comprising: a heating element casing which fits, as a structural unit, at least one PTC element having two main side surfaces and contact plates that energize said at least one PTC element and form contact strips for an electrical plug connection in order to electrically connect electrodes that are electrically connected to said at least one PTC element, wherein said at least one PTC element is covered with an insulation layer on each of the two main side surfaces, wherein said heating element casing comprises:

an injection-molded plastic frame which contacts said insulation layers only at edges thereof and which defines oppositely disposed frame openings, behind said frame opening, wherein said at least one PTC element with the two main side surfaces is located, wherein main side surfaces of said insulation layers are exposed by and are provided within the oppositely disposed frame openings, and wherein said plastic frame is connected, in one or more of a material-fit and a positive-fit manner, to said insulation layers and the at least one PTC element between the two insulation layers.

12. The PTC heating element according to claim 11, wherein each of said insulation layers abuts directly against said PTC element or is provided thereon.

13. The PTC heating element according to claim 11, wherein said PTC element and the insulation layers are connected to said plastic frame by overmolding them onto the material forming said plastic frame.

14. The PTC heating element according claim 11, wherein said material forming said plastic frame is an elastomeric plastic material.

15. The PTC heating element according to claim 11, wherein said contact strip is formed by a sheet metal strip which comprises a contact ridge abutting against a face side of said PTC element in an electrically conductive manner, and wherein said plastic frame forms an outer circumferential surface of said PTC heating element and is protruded only on one face side thereof by said two contact strips.

16. A positive temperature coefficient (PTC) heating element comprising: a heating element casing which fits, as a structural unit, at least one PTC element having two main face sides and contact plates that energize said at least one PTC element and form contact strips for an electrical plug connection in order to electrically connect electrodes that are electrically connected to said at least one PTC element, wherein said at least one PTC element is covered with an insulation layer on each of the two main side surfaces, wherein each of the insulation layers has rims, and wherein said heating element casing comprises:

a plastic frame which is made of an elastomeric plastic material and which defines oppositely disposed frame openings, wherein said plastic frame is joined to said insulation layers by injection molding the elastomeric plastic material around only the rims of the insulation layers, wherein the plastic frame provides a watertight seal around the insulation layers, and wherein the frame openings of said plastic frame expose the insulation layers, and wherein said plastic frame is connected, in one or more of a material-fit and a positive-fit manner, to said insulation layers and the at least one PTC element between the two insulation layers.

17. The PTC heating element according to claim 16, wherein each of said insulation layers abuts directly against said PTC element or is provided thereon.

18. The PTC heating element according to claim 16, wherein said contact strip is formed by a sheet metal strip that comprises a contact ridge abutting against a face side of said PTC element in an electrically conductive manner, and wherein said plastic frame forms an outer circumferential surface of said PTC heating element and is protruded only on one face side thereof by said two contact strips.

* * * * *